United States Patent
Sasada et al.

(10) Patent No.: US 6,636,470 B1
(45) Date of Patent: Oct. 21, 2003

(54) DISC LOADING MECHANISM OF DISC APPARATUS

(75) Inventors: Takeharu Sasada, Hachiouji (JP); Tsutomu Imai, Ohme (JP); Yosuke Haga, Ohmiya (JP); Shinji Masuda, Hino (JP); Atuomi Ono, Hachiouji (JP); Midori Murakami, Kokubunji (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/485,488

(22) PCT Filed: Jul. 30, 1998

(86) PCT No.: PCT/JP98/03405
§ 371 (c)(1),
(2), (4) Date: Feb. 11, 2000

(87) PCT Pub. No.: WO99/08274
PCT Pub. Date: Feb. 18, 1999

(30) Foreign Application Priority Data

Aug. 12, 1997 (JP) ............................... 9-230416
Sep. 19, 1997 (JP) ............................... 9-273541

(51) Int. Cl.⁷ ............................... G11B 17/04
(52) U.S. Cl. ..................... 369/77.1; 369/270
(58) Field of Search ............... 369/77.1, 77.2, 369/75.1, 75.2, 270; 360/99.02, 99.06

(56) References Cited

U.S. PATENT DOCUMENTS

| | | | |
|---|---|---|---|
| 4,510,591 A | | 4/1985 | Schatteman ................. 369/77.1 |
| 4,764,917 A | * | 8/1988 | Sugihara et al. ........... 369/75.1 |
| 5,031,169 A | * | 7/1991 | Kato et al. ................... 369/233 |
| 5,036,509 A | * | 7/1991 | Kobayashi et al. ........ 369/75.2 |
| 5,204,849 A | * | 4/1993 | Yamada et al. ........... 360/99.06 |
| 5,764,612 A | * | 6/1998 | Tanaka et al. .............. 369/75.2 |
| 6,084,838 A | * | 7/2000 | Tanaka et al. .............. 369/77.1 |
| 6,288,982 B1 | * | 9/2001 | Kato ........................ 369/30.36 |

FOREIGN PATENT DOCUMENTS

| | | |
|---|---|---|
| EP | 0666562 | 1/1995 |
| EP | 0 666 562 A2 | 8/1995 |
| EP | 0 833 320 A1 | 4/1998 |
| GB | 2234844 | 2/1991 |
| GB | 2 234 844 A | 2/1991 |
| JP | 5974560 | 5/1984 |
| JP | 62-008361 | 1/1987 |
| JP | 62-209765 | 9/1987 |
| JP | 63-298756 | 12/1988 |
| JP | 1235062 | 9/1989 |
| JP | 02-060944 | 5/1990 |
| JP | 2239461 | 9/1990 |
| JP | 03-005243 | 1/1991 |
| JP | 05-028617 | 2/1993 |
| JP | 6 44659 | 2/1994 |
| JP | 09-237455 | 9/1997 |

OTHER PUBLICATIONS

Chinese Office Action dated Jun. 21, 2002 and a full English Translation.

* cited by examiner

Primary Examiner—William Korzuch
Assistant Examiner—Angel Castro
(74) Attorney, Agent, or Firm—Eric J. Robinson; Robinson Intellectual Property Law Office, P.C

(57) ABSTRACT

A disc reproduction apparatus capable of stabilizing the position of the circumferential edge of a disc during the disc loading and preventing the disc from abutting on a turntable. In the disc reproduction apparatus of the type that a disc squeezed between a disc guide and a disc roller is loaded while the roller is rotated, a disc contact surface of the disc guide is slanted so that the disc is spaced from a turntable along a disc transport direction when the disc is loaded.

8 Claims, 8 Drawing Sheets

DISC LOADING MECHANISM OF DISC APPARATUS

BACKGROUND OF THE INVENTION

1. Field of the Invention

The present invention relates to a disc apparatus for a CD player or the like, and more particularly to a disc loading mechanism for transporting a disc to a reproduction position or ejecting a disc at the reproduction position to the outside of an apparatus.

2. Description of the Related Art

Figure 13:
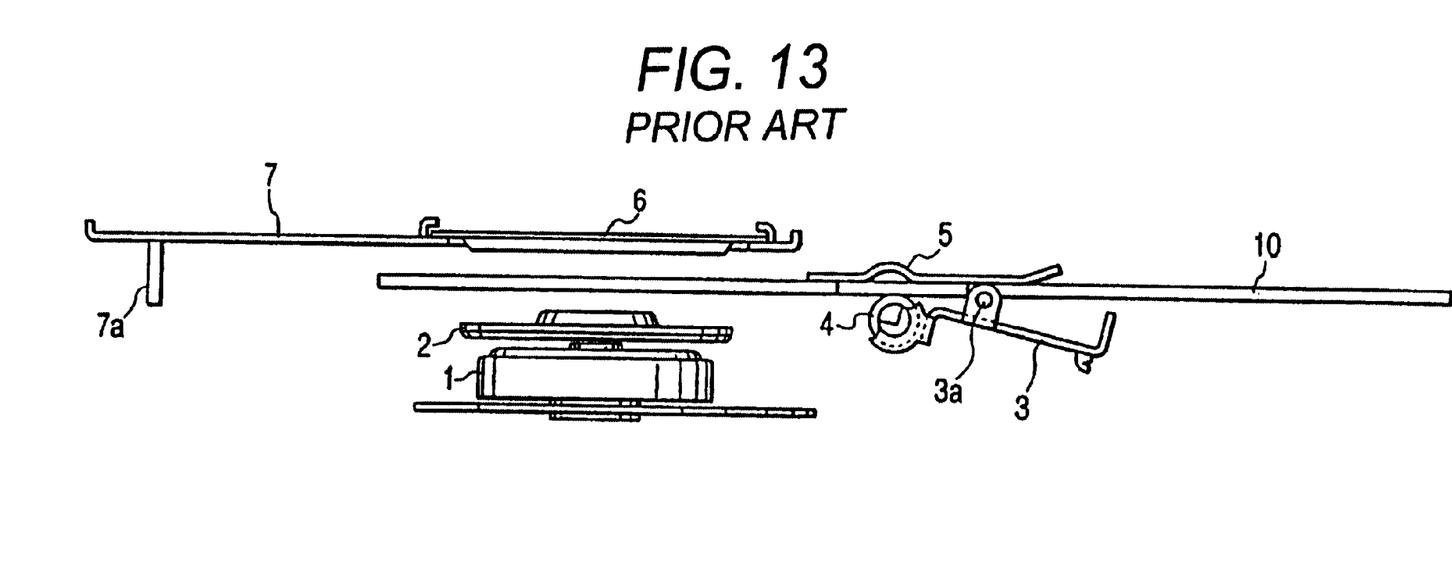
FIG. 13 is a side view partially in cross section showing the main part of a conventional disc reproduction apparatus.

An example of a conventional disc loading mechanism is shown in FIG. 13. A disc motor 1, a disc guide 5, and a support shaft 3a are fixed to an unrepresented reproduction unit chassis. A clamper holder 7 supports a clamper 6 movable up and down in a predetermined clearance range, the clamper holder being raised or lowered by an unrepresented drive mechanism.

A turntable 2 is fixed to the rotary shaft of the disc motor 1. A roller arm 3 pivotally supported by the support shaft 3a is energized in the clockwise direction by an unrepresented spring. The roller arm 3 is energized in the counterclockwise direction against the force of the spring by an unrepresented drive mechanism. A rubber roller 4 rotatively supported by the roller arm 3 is rotated by an unrepresented drive mechanism.

As a disc 10 is inserted from the right side as viewed in FIG. 2, this disc insertion is detected with an unrepresented detector, and a motor of the drive mechanism for the rubber roller 4 rotates to rotate the rubber roller 4 in the counterclockwise direction and transport the disc 10 in pressure contact with the disc guide 5 to the left side. When an unrepresented detector detects that the disc 10 is transported to the position where the disc 10 abuts on a disc stopper 7a projected from the clamper holder 7 above the turntable 2, the motor of the drive mechanism for the rubber roller 4 stops and the clamper holder 7 is lowered to squeeze the disc 10 with the clamper 6 and place it on the turntable 2. The clamper 6 is attracted by a magnetic force of the turntable 2 to clamp the disc 10 with the turntable 2. In this case, the clamper 6 and clamper holder 7 are not in contact with each other so that the disk 10 can be rotated by the disc motor and a reproduction ready state starts.

After the reproduction, the clamper holder 7 is raised and the roller arm 3 is rotated in the clockwise direction so that the rubber roller 4 makes the disc 10 in pressure contact with the disc guide 5. The rubber roller 4 further rotates in the clockwise direction to eject the disc 10 out of the apparatus.

With the conventional disc loading mechanism described above, however, since the disc 10 is transported toward the intermediate position between the clamper 6 and turntable 2, one side of the disc 10 is squeezed between the disc guide 5 and rubber roller 4 and supported in a cantilever way. If the apparatus vibrates, the disc 10 also vibrates and abuts on the turntable 2 so that the disc 10 may be damaged. In order to prevent the disc from abutting on the turntable 2 even if the disc 10 vibrates, a space between the turntable 2 and clamper 6 is required to be made broad, which increases the height of the apparatus. Furthermore, the position of the circumferential edge of the disc 10 cannot be stabilized while the disc 10 is loaded, so that the disc 10 may enter under the disc stopper 7a without is being stopped with it.

SUMMARY OF THE INVENTION

It is an object of the invention to provide a disc loading mechanism for a disc reproduction apparatus capable of stabilizing the position of the circumferential edge of a disc and preventing the disc from abutting on a turntable.

It is another object of the present invention to provide a disc loading mechanism capable of reliably stopping a disc at the home position with a disc stopper while the disc is transported to the reproduction position.

It is a further object of the present invention to provide a disc loading mechanism capable of preventing a disc from being engaged with a turntable or the like and from not being ejected, at the start of a disc eject operation.

In a disc loading mechanism for a disc reproduction apparatus of this invention in which a disc squeezed between a disc guide and a disc roller is loaded while the roller is rotated, a disc contact surface of the disc guide is slanted so that the disc is spaced from a turntable along a disc transport direction when the disc is loaded.

In a disc loading mechanism for a disc reproduction apparatus of this invention in which a disc squeezed between a transport roller and a disc guide is transported by a rotation of the transport roller to a reproduction position above a turntable or from the reproduction position to an outside of the apparatus and a clamper is lowered above the turntable to clamp the disc, when the clamper is raised to unclamp the disc, a disc holding member raises a circumferential edge of the disc.

In a disc loading mechanism for a disc reproduction apparatus of this invention in which a disc squeezed between a transport roller and a disc guide is transported by a rotation of the transport roller to a reproduction position above a turntable or from the reproduction position to an outside of the apparatus and a clamper is lowered above the turntable to clamp the disc, a disc stopper for position-aligning the disc at the reproduction position is provided with a slanted portion, and when the clamper is raised to unclamp the disc, the disc stopper moves toward the disc and raises a circumferential edge of the disc.

In a disc loading mechanism for a disc reproduction apparatus of this invention in which a disc squeezed between a transport roller and a disc guide is transported by a rotation of the transport roller to a reproduction position above a turntable or from the reproduction position to an outside of the apparatus, and a clamper is lowered above the turntable to clamp the disc, a disc stopper for position-aligning the disc at the reproduction position is provided with a flange under the disc stopper, and when the disc stopper stop the disc at the reproduction portion, the flange prevents the disc from entering under the disc stopper.

In a disc loading mechanism for a disc reproduction apparatus of this invention in which a disc squeezed between a transport roller and a disc guide is transported by a rotation of the transport roller to a reproduction position above a turntable or from the reproduction position to an outside of the apparatus and a clamper is lowered above the turntable to clamp the disc, a disc stopper rotatively mounted on a chassis for position-aligning the disc at the reproduction position is provided with a flange under the disc stopper and a slanted portion at a partial area of the disc stopper, when the disc stopper stops the disc at the reproduction portion, the flange prevents the disc from entering under the disc stopper and when the clamper is raised to unclamp the disc, the disc stopper rotates to raise a circumferential edge of the disc with the slanted portion.

DETAILED DESCRIPTION OF THE PREFERRED EMBODIMENTS

Figure 1:
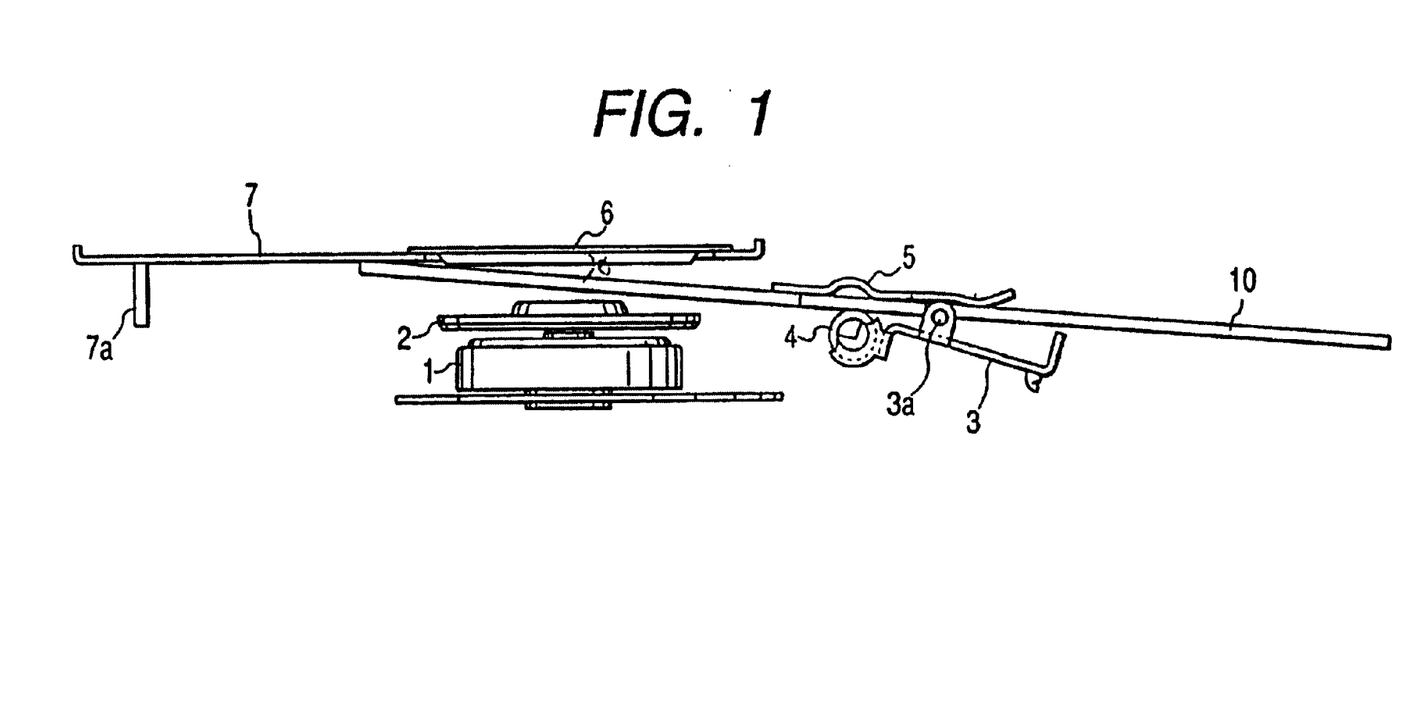
FIG. 1 is a side view partially in cross section showing the main part of a disc reproduction apparatus according to a first embodiment of the invention.

A disc reproduction apparatus according to an embodiment of the invention will be described with reference to the accompanying drawing. FIG. 1 shows a disc reproduction apparatus according to the embodiment of the invention. A disc motor 1, a disc guide 5, and a support shaft 3a shown in FIG. 1 are fixed to an unrepresented reproduction unit chassis. The disc guide 5 is slanted so that the left side thereof is made high. A clamper holder 7 supports a clamper 6 movable up and down in a predetermined clearance range, the clamper holder being raised or lowered by an unrepresented drive mechanism.

A turntable 2 is fixed to the rotary shaft of the disc motor 1. A roller arm 3 pivotally supported by the support shaft 3a is energized in the clockwise direction by an unrepresented spring. The roller arm 3 is energized in the counter-clockwise direction against the force of the spring by an unrepresented drive mechanism. A rubber roller 4 rotatively supported by the roller arm 3 is rotated by an unrepresented drive mechanism.

As a disc 10 is inserted from the right side as viewed in FIG. 2, this disc insertion is detected with an unrepresented detector, and a motor of the drive mechanism for the rubber roller 4 rotates to rotate the rubber roller 4 in the counter-clockwise direction and transport the disc 10 in pressure contact with the disc guide 5 to the left side. In this case, the disc 10 is slanted in conformity with the slanted disc guide 5 and becomes higher along the transport direction. Therefore, the circumferential edge of the disc 10 abuts on the clamper holder 7.

When an unrepresented detector detects that the disc 10 is transported to the position where the disc 10 abuts on a disc stopper 7a projected from the clamper holder 7 above the turntable 2, the motor of the drive mechanism for the rubber roller 4 stops and the clamper holder 7 is lowered to squeeze the disc 10 with the clamper 6 and place it on the turntable 2. The clamper 6 is attracted by a magnetic force of the turntable 2 to clamp the disc 10 with the turntable 2. In this case, the clamper 6 and clamper holder 7 are not in contact with each other so that the disc 10 can be rotated by the disc motor and a reproduction ready state starts.

After the reproduction, the clamper holder 7 is raised and the roller arm 3 is rotated in the clockwise direction so that the rubber roller 4 makes the disc 10 in pressure contact with the disc guide 5. The rubber roller 4 further rotates in the clockwise direction to eject the disc 10 out of the apparatus.

With the above structure the circumferential edge of the disc 10 abuts on the clamper holder 7 during the disc loading and the position of the edge is stabilized. It is therefore possible to prevent the disc 10 from abutting on the turntable 2 and being damaged.

The embodiment has the structure described above. However, the invention is not limited thereto. The turntable may be disposed under the disc motor to load a disc under the disc motor. Similarly, a disc may be loaded on the right or left side of the disc motor.

A disc loading mechanism for a disc reproduction apparatus such as a CD player according to the second embodiment of the invention will be described with reference to FIGS. 2A to 8. FIGS. 2A, 2B, 3A, and 3B are side views of the disc loading mechanism, and FIGS. 4 to 7 are plan views of the disc loading mechanism partially in a transparent view. A disc motor 1 and a disk guide 5 shown in the drawings are fixed to an unrepresented reproduction unit chassis. A turntable 2 is fixedly connected to a rotary shaft of the disc motor 1.

A clamper holder 7 is raised or lowered by an unrepresented lift mechanism supported by the reproduction unit chassis. A clamper 6 is placed on the clamper holder 7. A transport roller 4 is pivotally supported by the reproduction unit chassis and also rotatively supported by an unrepresented arm which is rotated by an unrepresented drive mechanism. The transport roller 4 is rotated by an unrepresented drive mechanism.

Disc stoppers 8 are pivotally supported by the reproduction unit chassis, and are energized by springs. The disc stopper 8 is rotated by an unrepresented drive mechanism or by a disc 10. An unrepresented lock mechanism for stopping the rotation of the disc stopper 8 is mounted on the reproduction unit chassis.

Figure 2A:
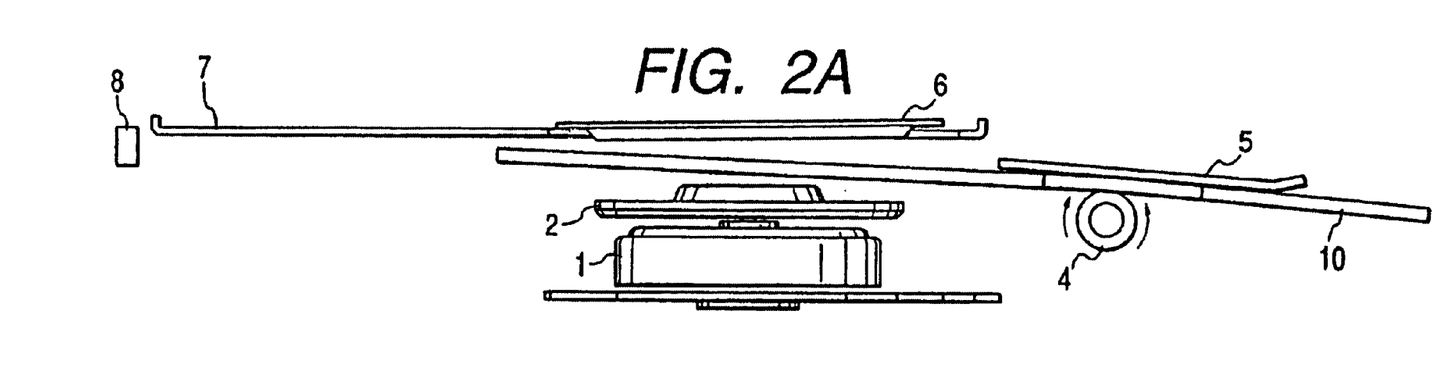
FIGS. 2A and 2B are side views showing a disc loading mechanism for a disc reproduction apparatus according to a second embodiment of the invention.
Figure 2B:
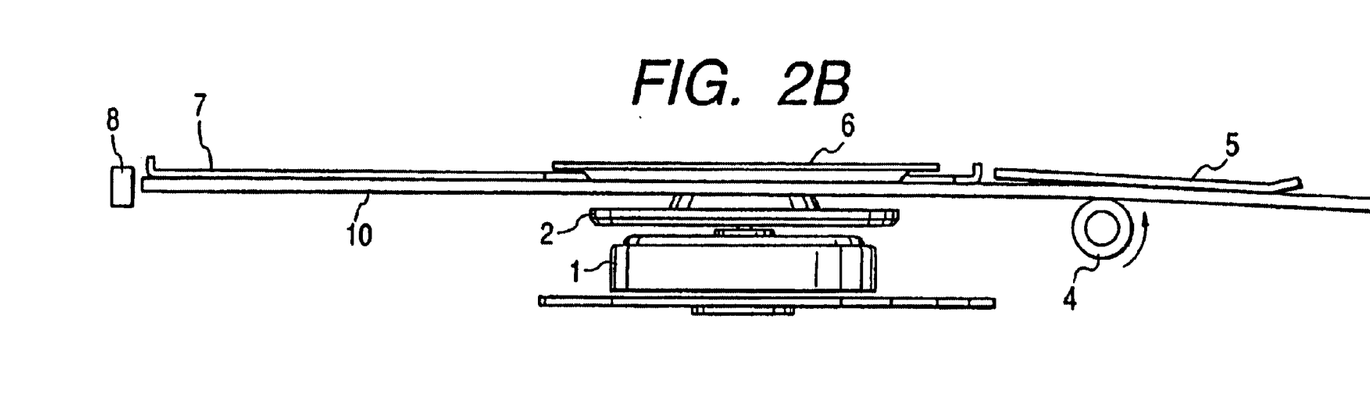

FIG. 2A shows the transport state of the disc 10 to a reproduction position above the turntable 2 or the transport state of the disc 10 from the reproduction position to the outside of the apparatus. The transport roller 4 is energized toward a disc guide 5. The transport roller 4 in pressure contact with the disc 10 transports the disc 10 while it is rotated in the counter-clockwise direction or clockwise direction. The lower surface of the disc guide 5 is inclined so that the disc 10 is also inclined in conformity with the inclined surface of the disc guide 5. It is therefore possible to transport the disc 10 without being abutted on a projection such as the turntable 2.

Figure 3A:
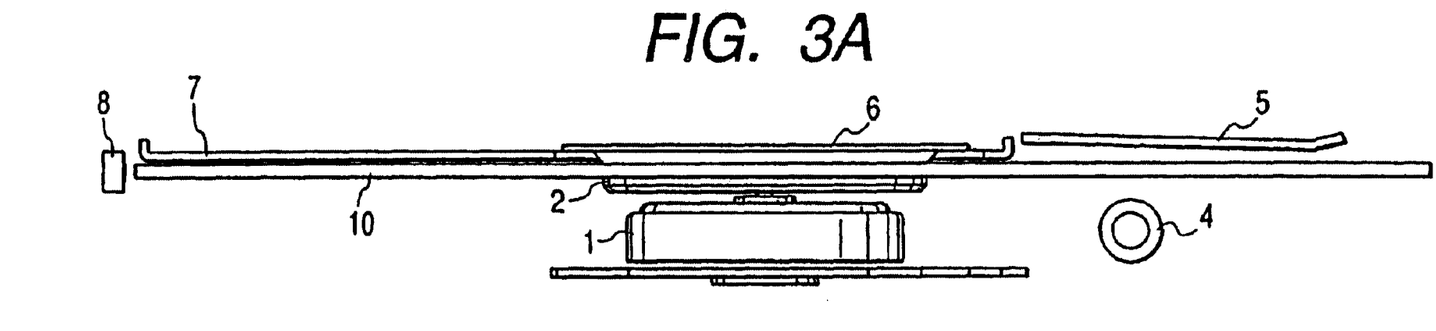
FIGS. 3A and 3B are side views showing another state of the disc loading mechanism.
Figure 3B:
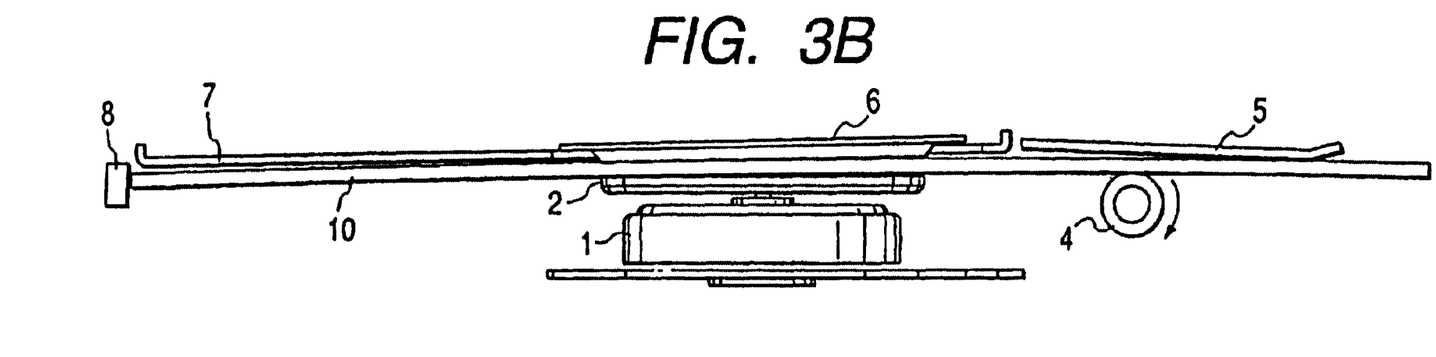
Figure 4:
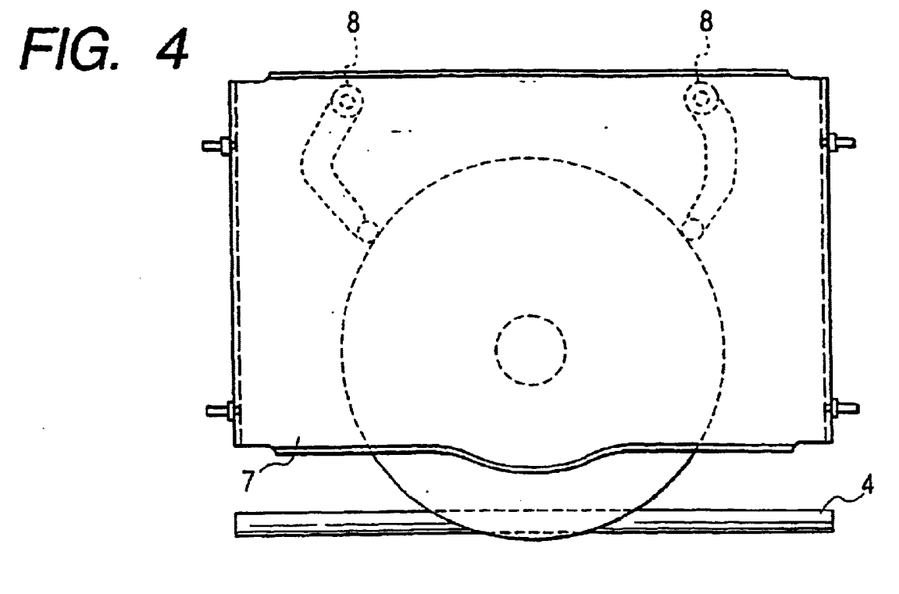
FIG. 4 is a plan view of the disc loading mechanism shown in FIG. 3B.
Figure 5:
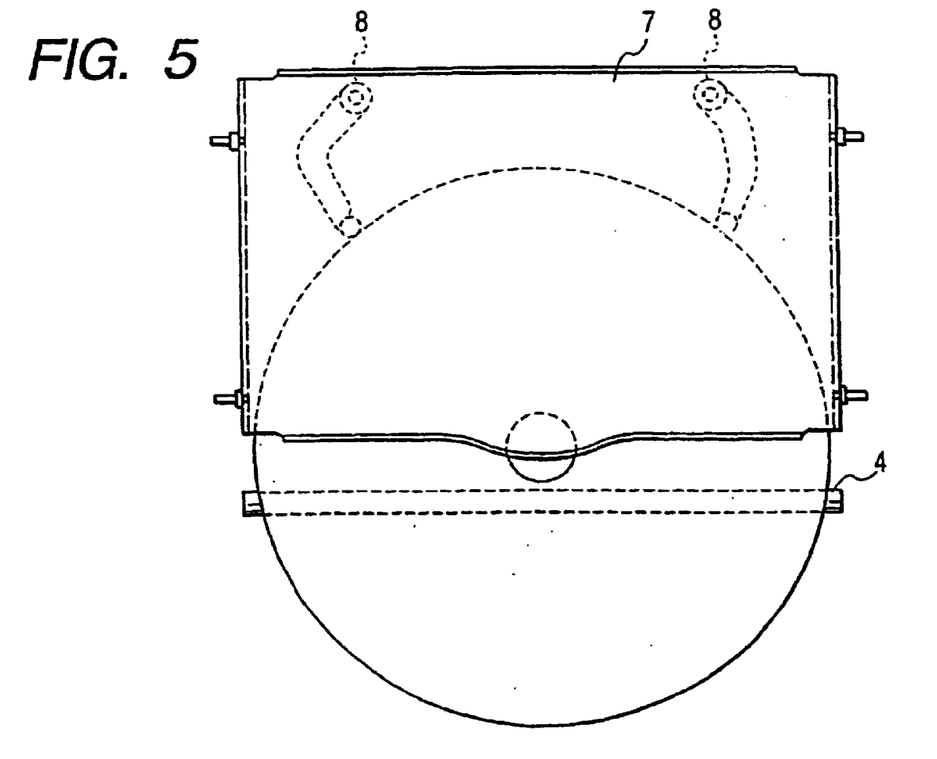
FIG. 5 is a plan view showing another state of the disc loading mechanism shown in FIG. 4.

FIG. 3B shows the state wherein the circumferential edges of the disc 10 abuts on the disc stoppers 8. The contact areas of the disc stoppers 8 are spaced from a disk transport center line as shown in FIGS. 4 and 5. In FIGS. 2A, 2B, 3A, and 3B, the disc stoppers 8 are shown near at the circumferential edge.

FIG. 4 shows the state wherein a small diameter disc (8 cm CD) is transported to abut on the disc stoppers 8. FIG. 5 shows the state wherein a large diameter disc (12 cm CD)

is transported to abut on the disc stoppers 8. While the disc 10 is transported to the reproduction position, an unrepresented discriminator discriminates between the large and small diameter discs. When the small diameter disc is transported, the disc stoppers 8 are in a locked state and the small diameter disc stops at the reproduction position as shown in FIG. 4.

Figure 6:
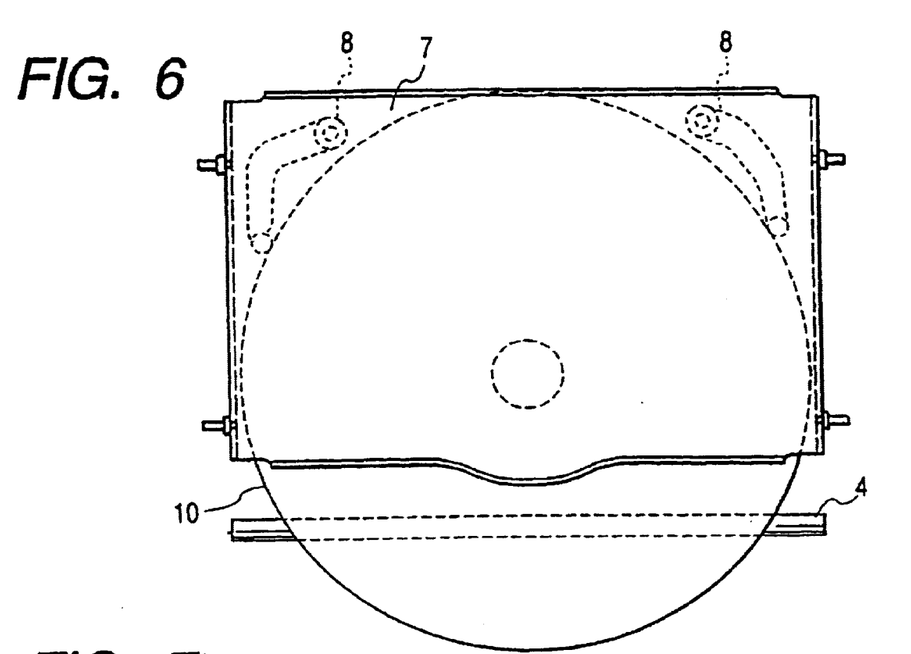
FIG. 6 is a plan view showing another state of the disc loading mechanism shown in FIG. 4.

When the large diameter disc is transported, the lock state of the disc stoppers 8 is released so that they are rotated to a large diameter disc stop position shown in FIG. 6 while they are pushed by the disc 10. At this position, the disc stoppers 8 are stopped by a lock mechanism to thereby align the large diameter disc at the reproduction position.

As an unrepresented detector detects that the disc is transported to the reproduction position, the clamper holder 7 is lowered to place the clamper 6 on the turntable 2. The clamper 6 is attracted by a magnetic force of the turntable 2 so that t.he disc 10 is squeezed between the clamper 6 and turntable 2.

Figure 7:
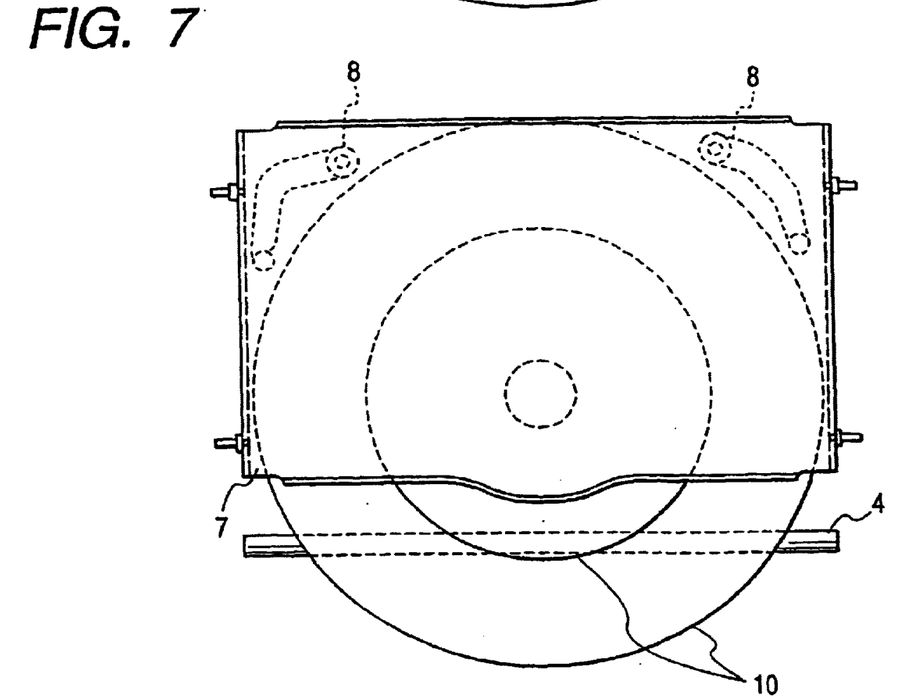
FIG. 7 is a plan view showing another state of the disc loading mechanism shown in FIG. 4.
Figure 8:
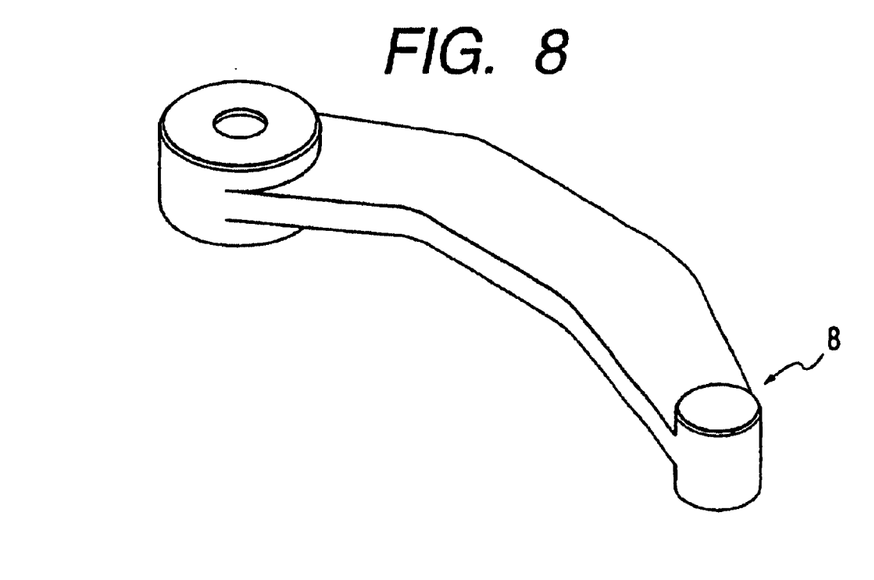
FIG. 8 is a perspective view of a disc stopper used by the disc loading mechanism shown in FIGS. 2A and 2B.

Next, the transport roller 4 is lowered and spaced apart from the disc 10, whereas the disc stoppers 8 are rotated and spaced from the disc 10. The disc clamp is completed in this state and the disc 10 takes a reproduction ready state to be rotated by the disc motor 1. The disc reproduction state is shown in FIGS. 3A and 7.

The disc unclamping and ejecting are performed with reversed operations of the operations described above. Specifically, the transport roller 4 moves near to the disc 10 and becomes in pressure contact with the disc 10 while the roller 4 is rotated, in order to eject the disc 10 as shown in FIG. 3B. Next, the clamper holder 7 is raised to separate the clamper 6 from the turntable 2. In this state, the roller 4 ejects the disc 10 out of the apparatus as shown in FIG. 2A.

Figure 9:
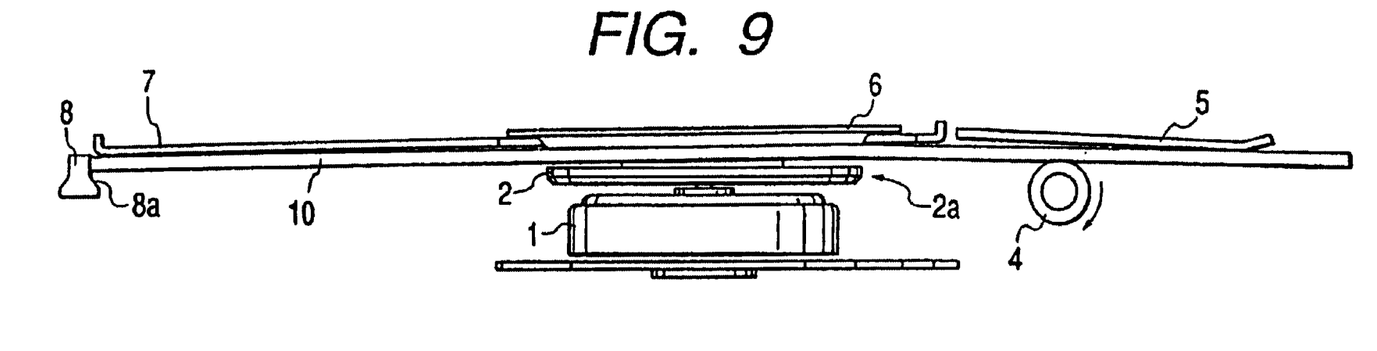
FIG. 9 is a side view of a disc loading mechanism for a CD player according to a third embodiment of the invention.
Figure 10:
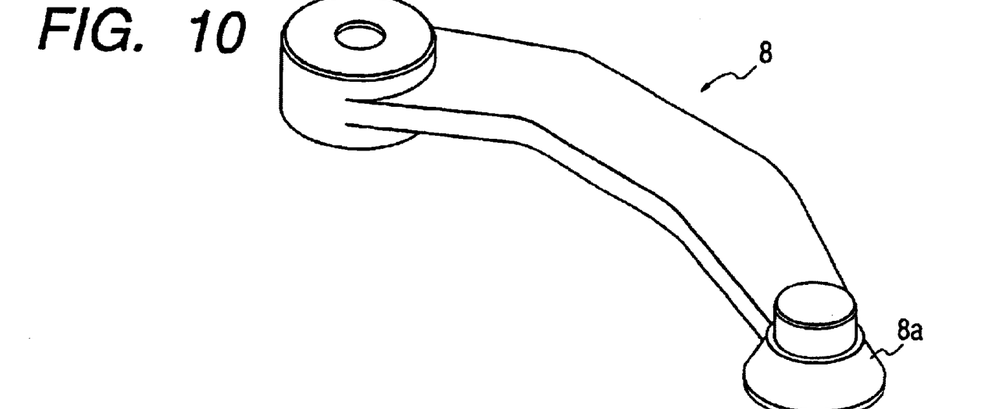
FIG. 10 is a perspective view showing a disc stopper used by the disc loading mechanism shown in FIG. 9.

Next, a disc loading mechanism for a disc reproduction apparatus such as a CD player according to the third embodiment of the invention will be described with reference to FIGS. 9 and 10. With the disc loading mechanism of the second embodiment described above, however, it can be though of that if the circumferential edge of the disc vibrates because of vibration of the apparatus when the disc 10 abuts on the disc stoppers 8 to be position aligned, the circumferential edge of the disk may enter under the disc stoppers e and that disc cannot be stopped at the home position. It can also be thought of that as shown in FIG. 3B, when the ejection operation of the disc 10 starts, if the transport roller 4 is made in pressure contact with the disc after the clamp holder 7 is raised, there is a period while the disc 10 is made free. From this reason, the transport roller 4 is first made in pressure contact with the disc. However, in this case, the disk 10 lowered by the clamper 6 receives a transport force so that the disc 10 engages with the turntable 2 and cannot be ejected. FIG. 9 is a side view of a disc loading mechanism for a disc reproduction apparatus such as a CD player of the third embodiment, and FIG. 10 is a perspective view showing a disc stopper used by the disc loading mechanism. As shown in FIG. 10, a disc stopper 8 has a taper or slanted portion 8a at its abut area on a disc. The other structure is the same as the disc loading mechanism described with FIGS. 2A to 7.

With this structure of the disc stopper 8, at the start of ejecting a disc 10 shown in FIG. 9, the disc stopper 8 rotates and raises the circumferential edge of the disc 10 with its slanted portion Ba. Therefore, it is possible to prevent the disc 10 from being engaged with the turntable 2 and from not being ejected.

Figure 11:
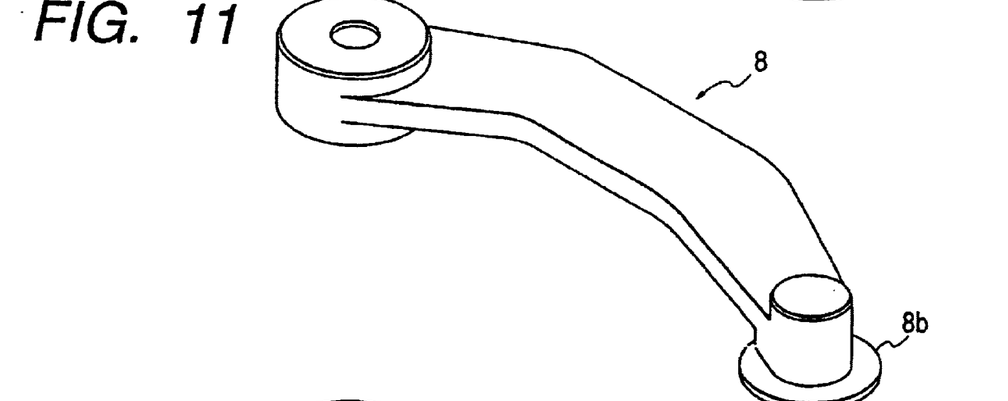
FIG. 11 is a perspective view showing another disc stopper used by the disc loading mechanism shown in FIG. 9.

FIG. 11 is a perspective view showing a disc stopper used by a disc loading mechanism for a disc reproduction apparatus such as a CD player, according to the fourth embodiment of the invention. As shown in FIG. 11, a disc stopper 8 has a flange 8b below at its cylindrical abut area on a disc. The other structure is the same as the disc loading mechanism described with FIGS. 2A to 7.

With this structure of the disc stopper 8, even if the disc 10 vibrates as it is transported toward the reproduction position and abuts on the disc stoppers 8, the disc is engaged with the flange 8b and does not enter under the disc stoppers 8.

Figure 12:
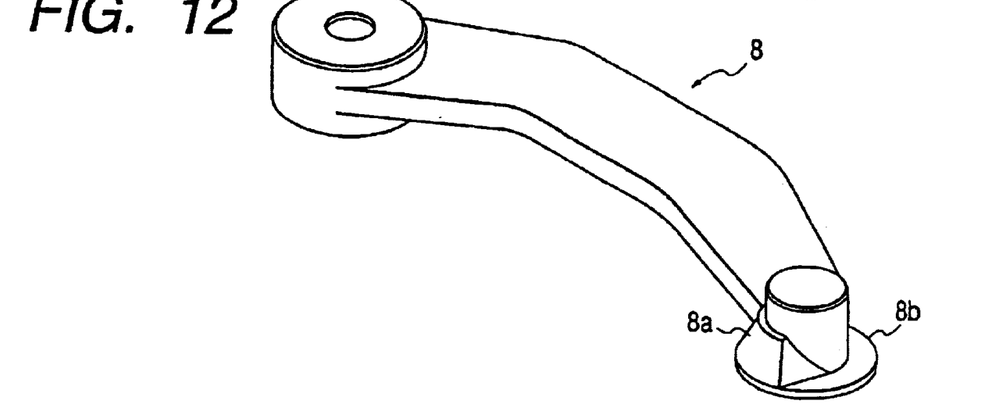
FIG. 12 is a perspective view showing another disc stopper used by the disc loading mechanism shown in FIG. 9.

FIG. 12 is a perspective view showing a disc stopper used by a disc loading mechanism for a disc reproduction apparatus such as a CD player, according to the fourth embodiment of the invention. As shown in FIG. 12, a disc stopper 8 has a flange 8b below at its cylindrical abut area on a disc and also has a taper or slanted portion 8a at a partial area of the cylindrical abut area. The other structure is the same as the disc loading mechanism described with FIGS. 2A to 7.

With this structure of the disc stopper 8, even if the disc 1 vibrates as it is transported toward the reproduction position and abuts on the disc stoppers 8, the disc is engaged with the flange 8b and does not enter under the disc stoppers 8. Furthermore, at the start of ejecting a large diameter disc shown in FIG. 6, the disc stopper 8 rotates and raises the circumferential edge of the disc 10 with its slanted portion 8a. Therefore, it is possible to prevent the disc 10 from being engaged with the turntable 2 and from not being ejected.

In each of the above embodiments, while the rubber roller 4 rotates, it transports the disc 10 whose non-record surface is in pressure contact with the disk guide 5. The disc guide 5 is therefore preferably made of a material which does not scratch the non-record surface of the disc 10, such as a hard metal plate with a smooth surface which does not damage the non-record surface of the disc 10 and leave any scratch dusts thereon. Since a disc guide holder of a conventional apparatus is not necessary, the number of components can be reduced and the manufacture cost can be lowered. In the disc loading mechanism of each of the above embodiments, a disc guide 5 is slanted higher toward the disc insertion direction. As the disc is transported toward the reproduction position, the disc does not abut on a projection such as the turntable because its circumferential edge is raised higher.

The embodiments have the structure described above. The invention is not limited only to the embodiments. For example, the disc stoppers may not be used in common for both the large and small diameter discs, but different disc stoppers may be used separately for the large and small diameter discs, with the disc engaging portion or a slanted portion being provided for each stopper. Furthermore, a disc lift mechanism of the disc stopper may be formed discretely relative to the disc stopper.

According to the disc loading mechanism for a disc reproduction apparatus of this invention, the circumferential edge of a disc will not vibrate during the disc loading. It is therefore possible to prevent the disc from abutting on the turntable and being damaged.

Further, since the circumferential edge of a disc will not vibrate during the disc loading, a space between the turntable and clamper is not required to broaden so that the mechanism can be thinned.

Furthermore, since the position of the circumferential edge of a disc is stabilized, the disc always abuts on the stopper and will not enter under the stopper.

According to the disc loading mechanism of this invention, since the disc circumferential edge is raised at the start of ejecting the disc, it is possible to prevent the disc from being engaged with the turntable and from not being ejected. Further, since the apparatus is not required to be thick in order to prevent the disc from being engaged with the turntable, the apparatus can be thinned.

Furthermore, even if the disc.vibrates as the disc is transported toward the reproduction position and abuts on the disc stoppers, the disc is engaged with the flanges of the disc stoppers so that the disc can be prevented from entering under the disc stoppers.

The disc stoppers shown in FIGS. 2A to 12 may be used not only with the disc loading mechanism shown in FIG. 1 but also with a conventional disc loading mechanism such as a mechanism having a disc guide not slanted.

What is claimed is:

1. A disc loading mechanism for a disc reproduction apparatus for loading a disc squeezed between a disc guide and a disc roller, said mechanism comprising a clamper holder for moving a camper in a horizontal state upwardly and downwardly, wherein a disc contact surface of said disc guide is constructed to be slanted so that the disc is spaced from a turntable along a disc transport direction, and while the disc is loaded, an edge of the disc slanted by the disc guide is in contact with said clamper holder when the disc is loaded.

2. A disc loading mechanism according to claim 1, wherein said clamper holder comprises a disc stopper for stopping the slanted disc loaded in a state where the disc is in contact with said clamper holder when the disc is transported to a disc reproduction position.

3. A disc loading mechanism according to claim 1, wherein said disc guide guides the disc whose non-record surface is in contact with said disc guide while the disc is transported.

4. A disc loading mechanism according to claim 1, comprising means for making a non-record surface of disc slanted by said disc guide in pressure contact with said disc guide when the disc is transported.

5. A disc loading mechanism for a disc reproduction apparatus for loading a disc squeezed between a disc guide and a disc roller, wherein when a clamper is raised to unclamp the disc, an edge of the disc is raised by a disc holding member formed on a stopper for moving in a radial direction of the disc in accordance with a disc size so as to position the disc, said holding member being tapered to the clamper.

6. A disc loading mechanism for a disc reproduction apparatus for loading a disc squeezed between a disc guide and a disc roller, wherein a slanted portion is provided on a disc stopper for moving in a radial direction of the disc in accordance with a disc size so as to position the disc, and when a clamper is raised to unclamp the disc, said disc stopper is moved in a disc direction to raise an edge of the disc with said slanted portion.

7. A disc loading mechanism for a disc reproduction apparatus for loading a disc squeezed between a disc guide and a disc roller, wherein a slanted portion and a non-slanted portion are provided on a side of a disc stopper for positioning the disc at a reproduction position, the disc is positioned by said non-slanted portion when the disc stopper is moved in a radial direction of the disc in accordance with a disc size so as to position the disc, the disc stopper is moved in a disc direction to raise an edge of the disc when a clamper is raised to unclamp the disc with said slanted position.

8. A disc loading mechanism for a disc reproduction apparatus for loading a disc squeezed between a disc guide and a disc roller, wherein a flange is provided on a lower portion of a disc stopper rotatively mounted on a chassis for positioning the disc at a reproduction position, a slanted portion is provided on a side of the disc stopper, said flange prevents the disc from entering under the disc stopper by mounting an edge of the disc on the flange when said disc stopper stops the disc at the reproduction position, and the disc stopper is rotated to raise an edge of the disc with the slanted portion when the clamper is raised to unclamp the disc.

* * * * *